United States Patent
Stolworthy et al.

(10) Patent No.: US 12,319,355 B2
(45) Date of Patent: Jun. 3, 2025

(54) MUD FLAP AND STEP ASSEMBLY

(71) Applicant: B&S Horses and Trucks Customizing, Idaho Falls, ID (US)

(72) Inventors: Bart Stolworthy, Idaho Falls, ID (US); Stephanie Stolworthy, Idaho Falls, ID (US)

(73) Assignee: B&S Horses and Trucks Customizing, Idaho Falls, ID (US)

( * ) Notice: Subject to any disclaimer, the term of this patent is extended or adjusted under 35 U.S.C. 154(b) by 319 days.

(21) Appl. No.: 18/059,825

(22) Filed: Nov. 29, 2022

(65) Prior Publication Data

US 2023/0092434 A1    Mar. 23, 2023

Related U.S. Application Data

(63) Continuation-in-part of application No. 17/130,875, filed on Dec. 22, 2020, now abandoned.

(51) Int. Cl.
  *B62D 25/18*    (2006.01)
  *B60R 3/00*    (2006.01)
  *B60R 13/08*    (2006.01)

(52) U.S. Cl.
  CPC ............. *B62D 25/188* (2013.01); *B60R 3/00* (2013.01); *B60R 13/08* (2013.01)

(58) Field of Classification Search
  CPC .......... B62D 25/188; B60R 3/00; B60R 13/08
  See application file for complete search history.

(56) References Cited

U.S. PATENT DOCUMENTS

| | | | | |
|---|---|---|---|---|
| 5,429,438 A | * | 7/1995 | Wood | F16C 29/02 384/42 |
| 5,513,866 A | | 5/1996 | Sisson | |
| 6,070,893 A | | 6/2000 | Thorndyke et al. | |
| 6,076,842 A | * | 6/2000 | Knoer | B62D 25/188 224/42.31 |
| 6,145,861 A | * | 11/2000 | Willis | B60D 1/58 280/164.2 |

(Continued)

FOREIGN PATENT DOCUMENTS

| | | |
|---|---|---|
| CN | 104554476 A | 4/2015 |
| CN | 105752168 A | 7/2016 |
| CN | 109050677 A | 12/2018 |

OTHER PUBLICATIONS

US Patent and Trademark Office; Office Action for U.S. Appl. No. 17/130,875 dated Jul. 1, 2022.

(Continued)

*Primary Examiner* — James A Shriver, II
*Assistant Examiner* — Ian Bryce Shelton
(74) *Attorney, Agent, or Firm* — Dorsey & Whitney, LLC

(57) ABSTRACT

A mud flap assembly has a bracket hanger and a mud flap. The bracket hanger has a body extending from a first end and a second end. The first end of the bracket hanger has a shape complementary to a bore of a receiver's maintube that extends along a width of the vehicle. The mud flap is connected to and extends downward from the bracket hanger. A coupler has a first end and a coupler bore opposite the first end. The first end of the coupler is complementary to an end of a maintube of a second vehicle. The coupler bore is complementary to the first end of the bracket hanger.

20 Claims, 8 Drawing Sheets

(56) References Cited

U.S. PATENT DOCUMENTS

| | | | | |
|---|---|---|---|---|
| 6,179,311 | B1* | 1/2001 | Larkin | B62D 25/188 280/154 |
| 6,250,025 | B1* | 6/2001 | Darby | E04H 13/006 52/142 |
| 6,375,223 | B1* | 4/2002 | Kirckof | B62D 25/188 280/154 |
| 6,485,178 | B1* | 11/2002 | Koban | F16C 29/12 384/42 |
| 6,994,362 | B2* | 2/2006 | Foster | B60R 3/005 280/166 |
| 7,185,904 | B1* | 3/2007 | Jones | B60R 9/06 280/166 |
| 7,407,194 | B1* | 8/2008 | Alley | B62D 25/188 280/154 |
| 7,766,357 | B2* | 8/2010 | Arvanites | B60R 3/007 182/127 |
| 7,931,302 | B2* | 4/2011 | Vaughn | B62D 25/186 280/847 |
| 7,954,836 | B2* | 6/2011 | Mann | B60R 3/02 280/166 |
| 9,085,264 | B2 | 7/2015 | Anderson | |
| 9,266,476 | B2* | 2/2016 | Mendoza | B60D 1/52 |
| 9,487,146 | B1* | 11/2016 | Lowell | B60R 3/007 |
| 9,487,147 | B1* | 11/2016 | Morrill | B60D 1/58 |
| 9,724,974 | B2* | 8/2017 | Schmeichel | B62D 25/182 |
| 9,821,716 | B1* | 11/2017 | Hernandez | B60R 3/007 |
| D827,536 | S | 9/2018 | Foley | |
| 10,086,879 | B2* | 10/2018 | Schmeichel | B62D 25/163 |
| 10,099,620 | B1* | 10/2018 | Sgroi | B60R 3/00 |
| 10,300,960 | B1* | 5/2019 | Wingen | B60D 1/58 |
| 10,391,944 | B2 | 8/2019 | Stanesic et al. | |
| 10,421,405 | B2 | 9/2019 | Good et al. | |
| 10,464,491 | B1* | 11/2019 | Masanek, Jr. | B60D 1/58 |
| 10,662,650 | B2* | 5/2020 | Lacroix | E04C 3/06 |
| 11,247,623 | B2* | 2/2022 | Schumacher | B60D 1/56 |
| 11,376,904 | B2 | 7/2022 | Fuller | |
| 2003/0011169 | A1 | 1/2003 | McCoy et al. | |
| 2003/0227168 | A1* | 12/2003 | Buuck | B62D 25/188 280/851 |
| 2004/0164539 | A1 | 8/2004 | Bernard | |
| 2007/0273123 | A1 | 11/2007 | Wilson | |
| 2008/0067775 | A1 | 3/2008 | DiCarlo et al. | |
| 2009/0079157 | A1* | 3/2009 | Fratzke | B60R 3/02 280/166 |
| 2009/0194967 | A1* | 8/2009 | Vaughn | B62D 25/188 280/154 |
| 2009/0243249 | A1* | 10/2009 | Arvanites | B60R 3/007 280/166 |
| 2014/0042736 | A1 | 2/2014 | Flaman | |
| 2014/0312604 | A1* | 10/2014 | Carrillo | B62D 25/168 29/428 |
| 2016/0001820 | A1 | 1/2016 | Schmeichel et al. | |
| 2016/0114835 | A1 | 4/2016 | Schmeichel et al. | |
| 2016/0318554 | A1* | 11/2016 | Schmeichel | B60D 1/58 |
| 2017/0334257 | A1 | 11/2017 | Stickles | |
| 2018/0178850 | A1* | 6/2018 | Schmeichel | B62D 25/188 |
| 2019/0256002 | A1 | 8/2019 | Patterson et al. | |

OTHER PUBLICATIONS

Rock Tamers Heat Shield; Rhr Swag Truck Accessories; cs@rhrswagicom 2021.

Shocker Heat Shield for Tow Flaps; Shocker Hitch Air Ride Towing Hitches 2022.

Extendable Hitch Mounted Step for 2" Hitches—Steel—Black-500 lbs; etailer.com 2022.

Hitch N' Sit 3 Seater; Think Outside the Stadium Hometeam Seats; hometeamseats.com 2022.

Hitch Stair with 2 Steps for 2" Trailer Hitches; etrailer 2022.

Side Truck Hitch Step; Great Day® TS300; CARiD.com 2022.

* cited by examiner

MUD FLAP AND STEP ASSEMBLY

RELATED APPLICATIONS

This application claims the benefit of U.S. patent application Ser. No. 17/130,875, filed on Dec. 22, 2020 and entitled "Mud Flap Assembly," the contents of which are incorporated herein by reference in its entirety.

FIELD OF THE DISCLOSURE

The embodiments described herein relate to a vehicle accessory. More particularly, the disclosure relates to systems and methods of using a mud flap with a step for accessing the bed of a pickup truck.

BACKGROUND

Description of the Related Art

Mud flaps are used to prevent debris that comes into contract with a spinning tire from being throw into a following vehicle or a trailer towed behind the primary vehicle. Mud flaps may be readily removeable but may require use of a hitch for connection to the vehicle, such as a pickup truck. When installed, known mud flaps may be mounted behind the bumper of the vehicle, which increases the overall length of the vehicle and permits debris to bound back into the bumper and tailgate. This can cause damage to the vehicle and/or dirt to be accumulated. Some vehicles may include mudguards, which are mounted within the wheel well of a vehicle in order to deflecting road debris away from the fender wells. Mudguards may not be readily removeable and provide limited protection.

FIG. 8 is an exploded view illustrating a known mud flap 20 installed upon a vehicle, such as a pickup truck 30. Mud flap 20 includes a square aperture 25 having a shape corresponding to a shank 15 of a hitch 10. The hitch 10 include a ball 11 for connecting to a trailer to be towed. The pickup truck 30 include a receiver 50 with a receiver tube 55 extending rearward from below a bumper 40 of the pickup truck 30. Bumper 40 may include a bumper step 45 positioned directly above the receiver tube 55 and extending perpendicular thereto. To install mud flap 20 upon pickup truck 30, a user inserts shank 15 of hitch 10 through square aperture 25 of mud flap 20 and into receiver tube 55. In some instances, mud flap 20 may be supported upon bumper step 45. Mud flap 20 may be, for example, clamped to shank 15 of hitch 10 to prevent movement with respect to hitch 10. When installed, mud flap 20 is positioned behind the bumper 40 of pickup truck 30 and requires hitch 10 to be mounted within receiver tube 55. To remove mud flap 20, hitch 10 must first be removed. Other disadvantages of known mud flaps and mudguards may exist.

SUMMARY

The present disclosure is directed to methods and systems that overcome or lessen some of the problems and disadvantages discussed above. Not all embodiments provide the same advantages or the same degree of advantage.

One exemplary embodiment is a mud flap assembly having a bracket hanger and a mud flap. The mud flap assembly is compatible with a vehicle having a receiver with a maintube extending along a width of the vehicle. The bracket hanger has a body extending from a first end and a second end. The first end has a shape complementary to a bore of the maintube. The mud flap is connected to and extends downward from the bracket hanger. The mud flap is positioned closer to the second end of the bracket hanger than the first end of the bracket hanger. The first end of the bracket hanger may have a rectangular shape.

The mud flap assembly may include a coupler. The coupler may have a first end and a coupler bore opposite the first end. The first end of the coupler is complementary to an end of a maintube extending along a width of a second vehicle. The first end of the coupler has a different shape from the first end of the bracket hanger. The coupler bore is complementary to the first end of the bracket hanger. The first end of the coupler may be shaped to be received with a bore in the end of the maintube of the second vehicle. The first end of the bracket hanger may have a rectangular shape. The first end of the coupler may have a circular aperture that is complementary to the end of the maintube of the second vehicle.

The bracket hanger may be a first bracket hanger and the mud flap be a first mud flap. The maintube includes a first end and a second end. The shape of the first end of the first bracket hanger is complementary to the bore of the maintube at the first end of the maintube. The mud flap assembly may include a second bracket hanger and a second mud flap.

The second bracket hanger has a body extending from a first end and a second end. The first end of the second bracket hanger has a shape complementary to the bore of the maintube at the second end of the maintube. The second mud flap is connected to and extends downward from the second bracket hanger. The second mud flap is positioned closer to the second end of the second bracket hanger than the first end of the second bracket hanger.

One exemplary embodiment is a mud flap system having a first bracket hanger, a second bracket hanger, a first mud flap, and a second mud flap. The first bracket hanger has a first body extending between a first end and a second end. The first of the first bracket hanger is connected to a first end of a maintube of a receiver of a vehicle. The first body extends along a width of the vehicle. The first mud flap is connected to and extends downward from the first bracket hanger. The second bracket hanger has a second body extending between a first end and a second end. The first end of the second bracket hanger is connected to a second end of the maintube of the receiver of the vehicle, the second body extending along the width of the vehicle. The second mud flap is connected to and extends downward from the second bracket hanger.

The first bracket hanger may extend beyond a first side panel of the vehicle and/or the second body of the second bracket hanger may extend beyond a second side panel of the vehicle. The width of the vehicle extends between the first side panel and the second side panel.

The first end of the first bracket hanger may be complementary to a bore at the first end of the maintube and positioned within the bore at the first end of the maintube. The first end of the second bracket hanger may be complementary to a bore at the second end of the maintube and positioned within the bore at the second end of the maintube. The first end of the first bracket hanger has a rectangular shape.

The mud flap system may include a first set screw extending through a first aperture in a wall of the maintube and in contact with the first end of the first bracket hanger. The mud flap system may include a coupler having a first end and a coupler bore opposite the first end. The first end of the coupler is complementary to the first end of the maintube. The first end of the first bracket hanger is complementary to the coupler bore and positioned within the coupler bore. The first end of the coupler may be positioned within a bore at the first end of the maintube. The first end of the coupler may have a circular aperture positioned around the first end of the maintube.

One exemplary embodiment is a method of installing a mud flap. The method includes providing a mud flap assembly and connecting the mud flap assembly to a vehicle having a receiver with a maintube extending along a width of the vehicle by connecting the first end of the body of the bracket hanger to a first end of the maintube. The connection may be on the frame rails at the end of the maintube. The vehicle may include a front end, a rear end, a length extending from the front end to the rear end. The length is perpendicular to the width of the vehicle.

The first end of the maintube may include a bore. Connecting the mud flap assembly to the vehicle may include inserting the first end of the body of the bracket hanger into the bore of the maintube. The method may include sliding the first end of the bracket hanger within the bore of the maintube and securing the first end of the body of the bracket hanger within the bore of the maintube. The first end of the body of the bracket hanger may be secured to the maintube by positioning a fastener through a hole in a wall of the maintube and contacting the first end of the body of the bracket hanger. The method may include drilling the hole through the wall of the maintube. The second end of the bracket hanger may extend beyond a side panel of the vehicle when the bracket hanger is secured within the bore of the maintube.

The method may include providing a second mud flap assembly and inserting the first end of the body of the second bracket hanger into a bore of the maintube at the second end of the maintube.

The method may include providing a coupler having a first end and a coupler bore opposite the first end. The first end of the coupler is complementary to the first end of the maintube. The first end of the bracket hanger is complementary to the coupler bore. The method may include securing the first end of the coupler to the first end of the maintube and inserting the first end of the bracket hanger into the coupler bore. Securing the first end of the coupler to the first end of the maintube may include inserting the first end of the coupler into a bore of the maintube and securing the first end of the coupler within the bore of the maintube.

One exemplary embodiment of a mud flap assembly includes a bracket hanger, a mud flap, and a foot support. The bracket hanger has a body with a length extending between a first end and a second end and a width perpendicular to the length. The first end of the bracket hanger is configured to connect to a receiver of a vehicle. The mud flap is connected to the bracket hanger. The mud flap extends along the length of the bracket hanger and extends downward from the bracket hanger. The foot support is connected to the bracket hanger. The foot support includes a first platform having a length extending along the length of the bracket hanger and a width perpendicular to the length of the first platform.

A position of the foot support may be slidably adjustable along the length of the bracket hanger. A position of the mud flap may be slidably adjustable along the length of the bracket hanger. The first end of the bracket hanger may have a shape complementary to a bore of a maintube of the receiver of the vehicle.

The width of the first platform may be greater than the width of the bracket hanger. The width of the first platform may be at least 3.5 inches and the length of the first platform may be at least eight inches. The length of the first platform may be greater than the width of the first platform.

The foot support may include a second platform rigidly connected to the first platform. The first platform may be positioned above the bracket hanger. The second platform is positioned below the first platform. The first platform and the second platform may be horizontally offset. The foot support may include a plurality of braces extending downward from the first platform and along a top surface of the second platform.

The body of the bracket hanger may include a top side, a first lateral side, a second lateral side opposite the first lateral side, and at least one groove extending along the length of the bracket hanger. The mud flap may be connected to the first lateral side.

The at least one groove may be positioned on the top side, the foot support may be slidably connected in the at least one groove. The at least one groove may be positioned on the first lateral side, the mud flap may be slidably connected in the at least one groove. The at least one groove may be positioned on the second lateral side, and further comprising a heat shield slidably connected in the at least one groove. The heat shield may not contact the mud flap. The heat shield and the mud flap form an airgap therebetween having a thickness of at least two inches and preferably at least 2.5 inches.

The least one groove may be a plurality of grooves including a first groove positioned on the top side and a second groove positioned on the first lateral side. The foot support may be slidably connected in the first groove and the mud flap may be slidably connected in the second groove. The plurality of grooves may include a third groove positioned on the second lateral side. The mud flap assembly may include a heat shield slidably connected in the third groove. The plurality of grooves may include a fourth groove positioned on the lateral side. The fourth groove is positioned above the second groove. The foot support may be slidably connected in the fourth groove.

The plurality of grooves may have a T-slot profile. The first platform may include a top surface having a plurality of openings and recessed portions. The openings may be slots. The openings may be positioned within the recessed portions of the top surface and each shaped to receive a shaft of a fastener. The fastener slidably connects the foot support to the bracket hanger.

The mud flap assembly may include a coupler having a first end and a coupler bore opposite the first end. The first end of the coupler may be complementary to an end of a maintube extending along a width of a second vehicle. The first end of the coupler has a different shape from the first end of the bracket hanger and the coupler bore may be complementary to the first end of the bracket hanger. The first end of the coupler may have a circular aperture complementary to the end of the maintube of the second vehicle.

While the disclosure is susceptible to various modifications and alternative forms, specific embodiments have been shown by way of example. The features, functions, and advantages that have been discussed can be achieved independently in various embodiments or may be combined in yet other embodiments further details of which can be seen with reference to the drawings and the following description. However, it should be understood that the disclosure is not intended to be limited to the particular forms disclosed. Rather, the intention is to cover all modifications, equivalents and alternatives falling within the scope of the disclosure as defined by the appended claims.

Furthermore, it should be understood that the figures herein are not necessary drawn to scale or uniform and certain features may be exaggerated for ease of illustration. The shapes, sizes, configurations, and/or locations of elements are shown for illustrative purposes and may be varied as would be appreciated by one of ordinary skill in the art having the benefit of this disclosure.

DETAILED DESCRIPTION

Figure 1:
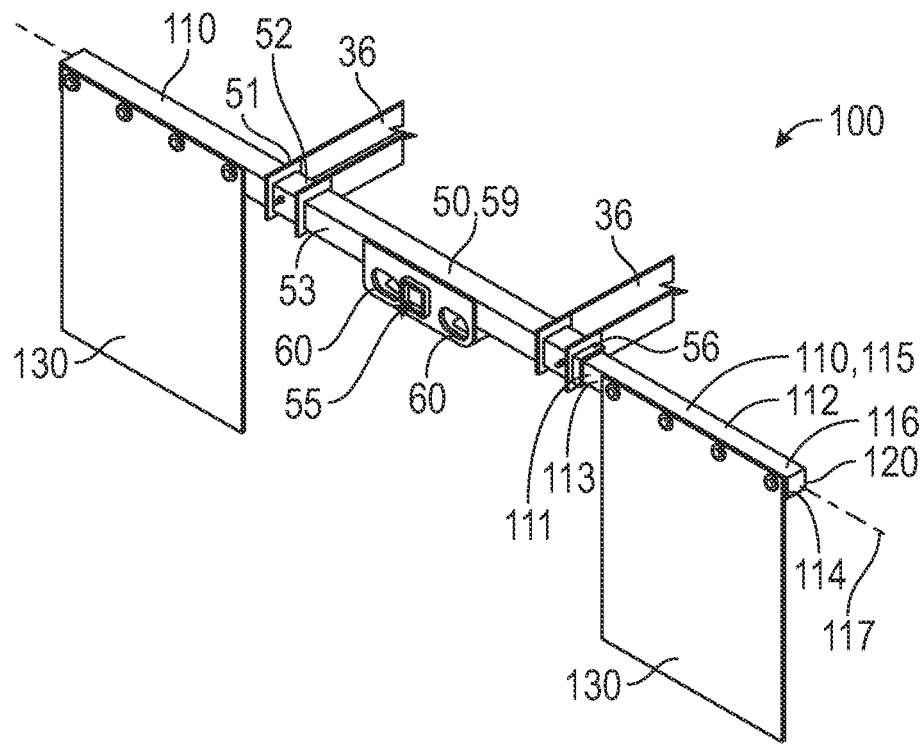
FIGS. 1 and 2 shows an embodiment of a mud flap assembly.
Figure 2:
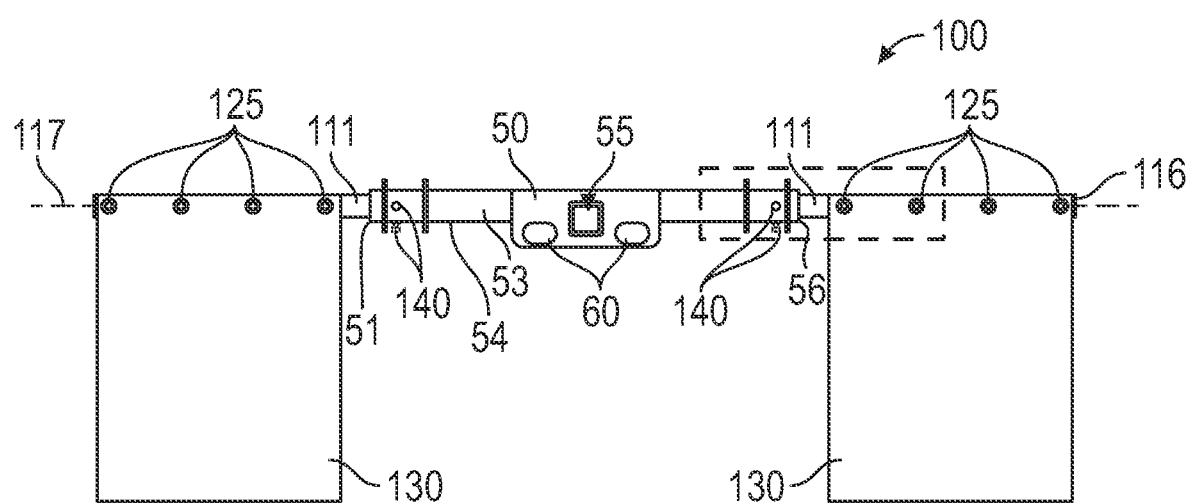
Figure 4:
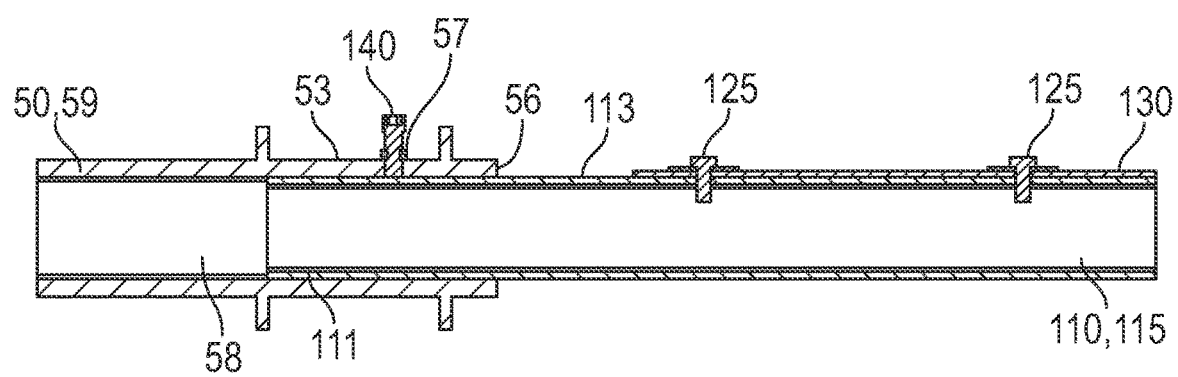
FIG. 4 is a cross-sectional view of a portion of the embodiment shown in FIG. 3.
Figure 5:
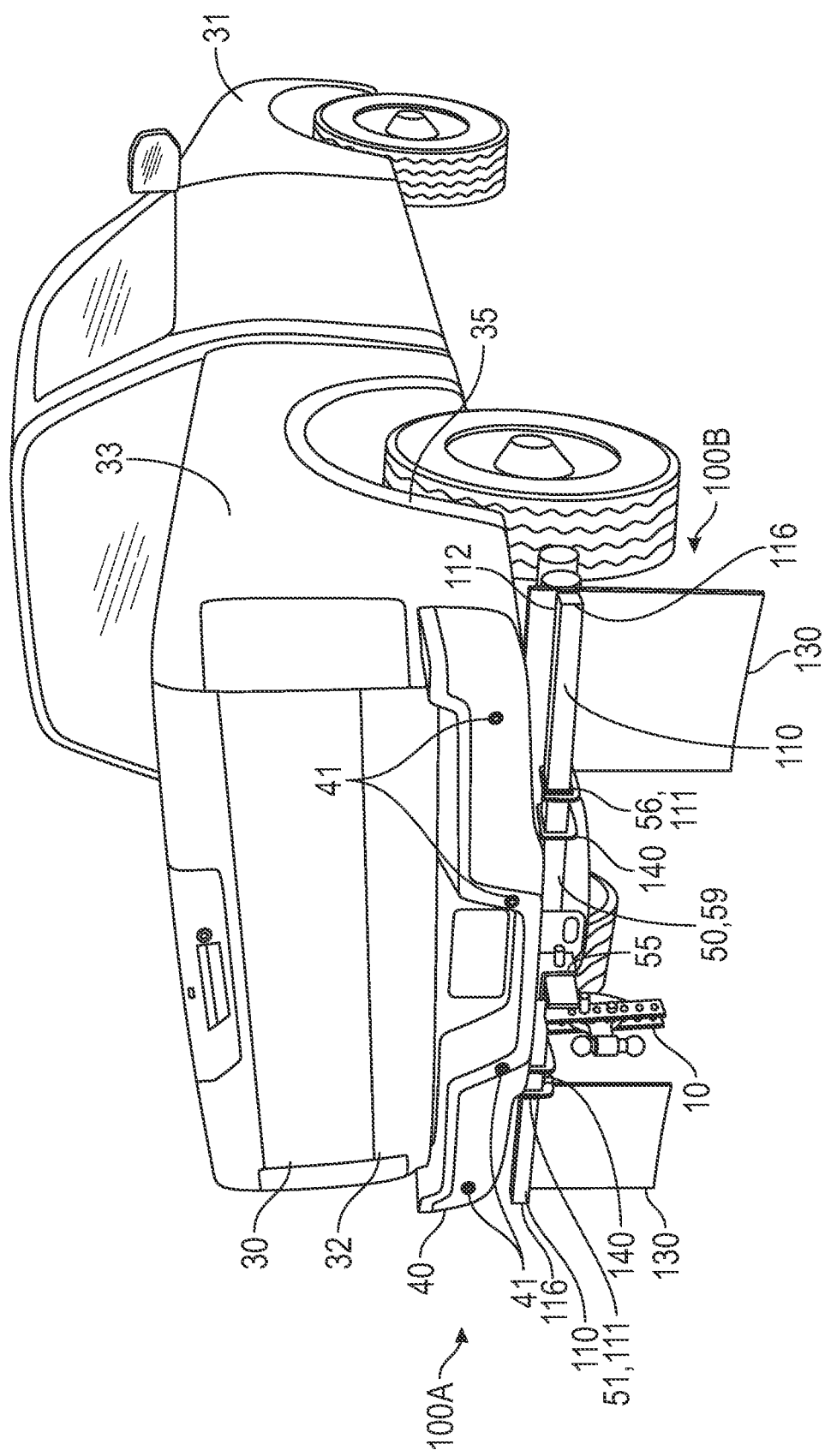
FIG. 5 shows an embodiment of a mud flap assembly installed on a pickup truck.

FIGS. 1 and 2 show an embodiment of a mud flap assembly 100. Mud flap assembly 100 can be used with a vehicle, such as pickup truck 30 (shown in FIG. 5) that includes a receiver 50. For purposes of illustration, only receiver 50 has been shown in FIGS. 1 and 2. Receiver 50 includes a first end 51, a second end 56, and a maintube 59 extending from first end 51 to second end 56. Located at a midpoint between first end 51 and second end 56 is a receiver tube 55 that is perpendicular to a length of maintube 59, which extends from first end 51 to second end 56. On opposing sides of receiver tube 55 are chain attachment holes 60 for connecting a safety chain of a trailer being towed (not shown). As shown in FIG. 5, maintube 59 extends along a width of pickup truck 30 and receiver tube 55 is oriented along a length of pickup truck 30. Receiver tube 55 may be a class I, class II, class II, class IV, or class V receiver, as is known the art, for receiving a hitch 10 (shown in FIG. 5). Preferably, receiver tube 55 may be a class IV or class V receiver. Maintube 59 includes a bore 58 (shown in FIG. 4) extending from first end 51 towards receiver tube 55 and extending from second end 56 towards receiver tube 55. Bore 58 may extend from first end 51 to second end 56. In some configurations, first end 51 and/or second end 56 of maintube 59 may be cut off to reveal bore 58.

Referring again to FIGS. 1 and 2, receiver 50 is supported by a plurality of frame rails 36 that extend along a length of the pickup truck 30 (shown in FIG. 5). A first frame rail 36 may be connected at first end 51 and a second frame rail 36 may be connected at second end 56, with frame rails 36 extending parallel to receiver tube 55. The first end 51 and second end 56 of maintube 59 extend to or beyond an outer side of the frame rails 36. Receiver tube 55 is located between the frame rails 36 and the mud flap assemblies 100 are positioned on the outer sides of the frame rails 36. In some configurations, maintube 59 includes a top side 52, a lateral side 53, and a bottom side 54. Maintube 59 may be a square tube with lateral side 53 perpendicular to both top side 52 and bottom side 54. Receiver tube 55 may extend beyond lateral side 53 and be perpendicular to a plane formed by lateral side 53.

Mud flap assembly 100 includes a bracket hanger 110. Bracket hanger 110 has a body 115 extending from a first end 111 to a second end 116. Body 115 may extend linearly along an axis 117 from first end 111 to second end 116. The length of body 115 may be at least 30 inches. In some embodiments, first end 111 may not be linearly aligned with second end 116 in order to provide clearance for components on an underside of pickup truck 30 (not shown in FIGS. 1 and 2). First end 111 of bracket hanger 110 is connected to first end 51 or second end 56 of maintube 59 to support mud flap assembly 100 upon the vehicle. First end 111 of bracket hanger 110 may be connected to maintube 59 by a complementary relationship or through a coupler that permits bracket hanger 110 to be secured to maintube 59 or to frame rails 36 adjacent to maintube 59.

In some embodiments, the shape of bracket hanger 110 at first end 111 is complementary to maintube 59 at first end 51 and/or second end 56 such that first end 111 of body 115 is shaped to be received within bore 58 (shown in FIG. 4) of maintube 59 and secured therein. In other embodiments, the complementary relationship may be reversed with a bore on the end of the bracket hanger and the end of the bracket hanger is received over the end of the maintube.

In some configurations, body 115 has a rectangular shape. In some embodiments, at least first end 111 has a rectangular shape. Body 115 may be formed of square tubing. Body 115 includes a top side 112. When mud flap assembly 100 is positioned on a pickup truck, top side 112 is positioned to function as a step to permit a user to access the bed of the pickup truck. Top side 112 is shaped sufficiently large to support a foot. Top side 112 may have a width of at least two inches (measured perpendicular to a length of body 115 that extends from first end 111 to second end 116) and preferably at least 2.5 inches. In some embodiments, a width of the bracket hanger 110 at the second end 116 is larger than the width of the bracket hanger 110 at the first end 111. The foot support may be integral to bracket hanger 110 or may be moveably attached to bracket hanger 110.

In some configurations, body 115 includes a top side 112, a lateral side 113, and a bottom side 114. Body 115 may be a square tube with lateral side 113 perpendicular to both top side 112 and bottom side 114. Bracket hanger 110 may include an endcap 120 positioned at second end 116. Mud flap assembly 100 includes a mud flap 130 connected to and extending downward from bracket hanger 110. Mud flaps 130 may not cover top side 112 so as to not interfere with the step function of top side 112. A plurality of flange bolts 125 may extend through mud flaps 130 and into body 115 in order to secure mud flaps 130 onto body 115. Mud flap 130 is positioned closer to second end 116 of bracket hanger 110 than first end 111 of the bracket hanger 110.

Figure 3:
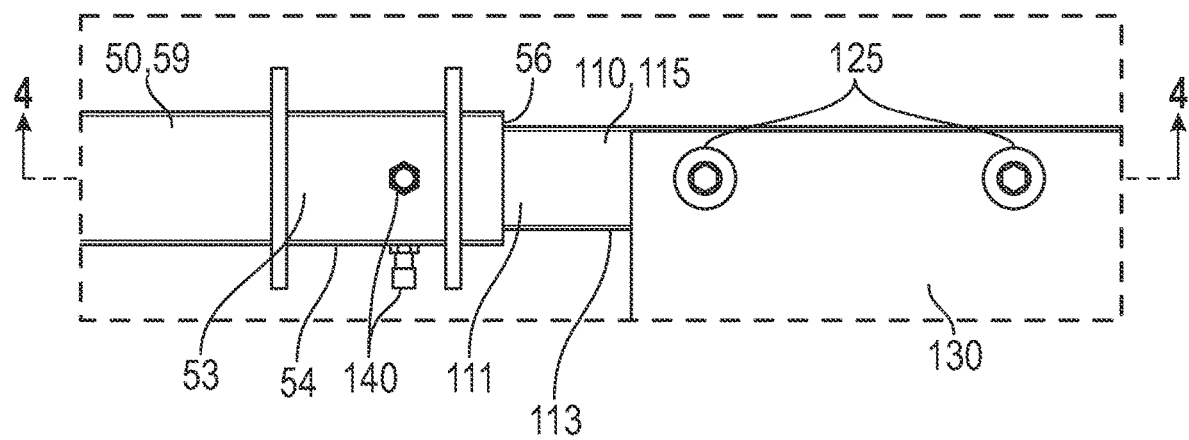
FIG. 3 is a detailed view of a portion of the embodiment shown in FIG. 2.

FIG. 3 is a detailed view of a portion of the embodiment shown in FIG. 2. FIG. 4 is a cross-sectional view of the portion of the embodiment shown in FIG. 3. Maintube 59 of receiver 50 is formed of walls with a bore 58 therein. Maintube 59 includes one or more apertures 57, such as a plurality of apertures 57, extending through the walls of maintube 59. Apertures 57 may be threaded. A set screw 140 may be threaded within aperture 57 and extends through the wall of maintube 59 so that set screw 140 contacts bracket hanger 110 near first end 111. As shown in FIG. 3, a set screw 140 extends through the walls formed by lateral side 53 and bottom side 54. As shown in FIG. 4, set screw 140 extending through lateral side 53 is placed into contact with lateral side 113 of body 115. Set screw 140 may be loosened so that it is no longer in contact with body 115 and bracket hanger 110 may slide within bore 58 of maintube 59 to adjust the amount of body 115 that extends beyond second end 56 of maintube 59. Mud flaps 130 are positioned against lateral side 113 of body 115 and flange bolts 125 extend through mud flaps 130, through lateral side 113, and into an interior of body 115. FIGS. 3 and 4 are illustrated with respect to second end 56 of maintube 59 but are equally applicable to another bracket hanger 110 that is received within first end 51 (shown in FIG. 1).

In another embodiment, set screw 140 may be replaced with a pin that extends through opposing walls of body 115 and through opposing walls of maintube 59. Set screws 140 may be advantageous over a pin in order to increase adjustability of bracket hanger 110.

Figure 8:
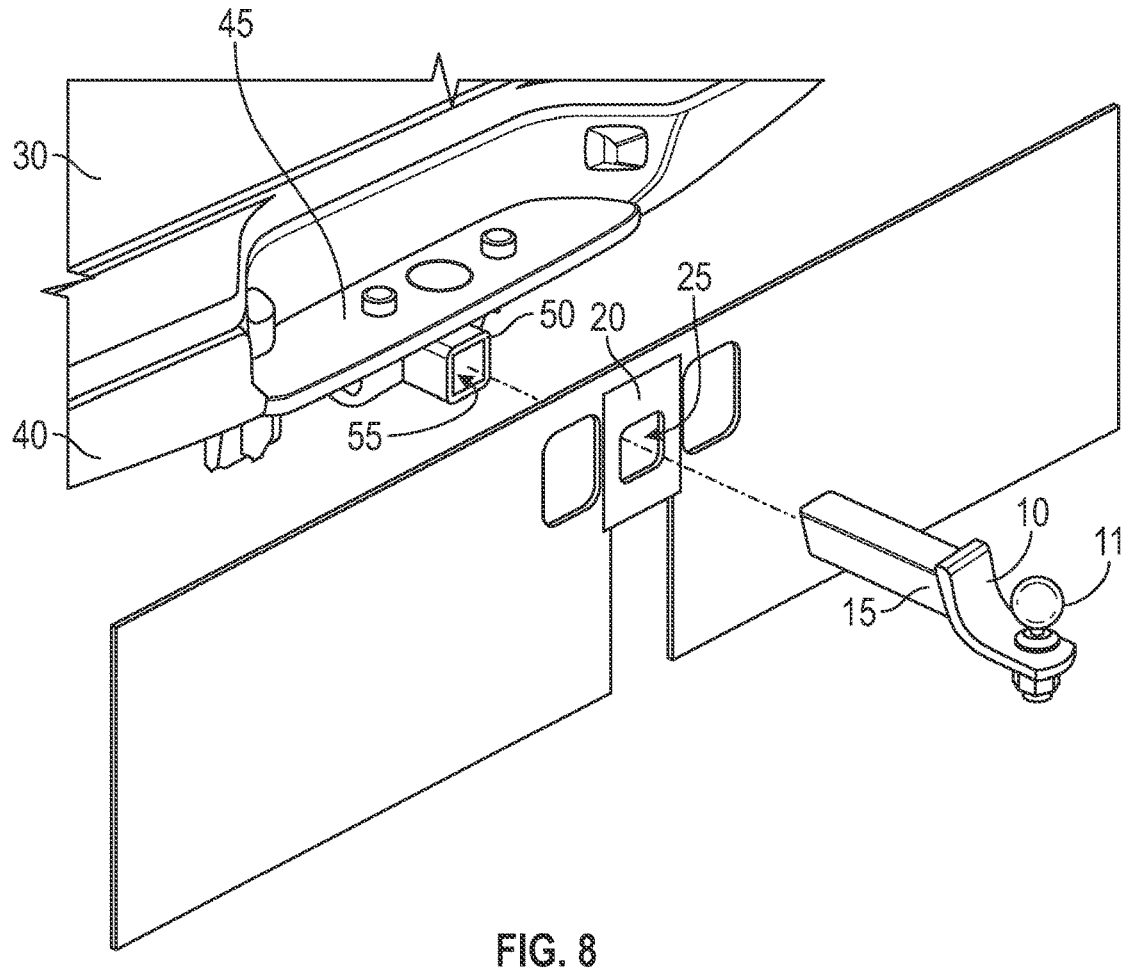
FIG. 8 is an exploded view illustrating a known mud flap installed upon a vehicle.

FIG. 5 shows an embodiment of a mud flap assembly 100 installed on a vehicle, such as pickup truck 30, to form a mud flap system. Pickup truck 30 includes a front end 31, a rear end 32, a length extending from front end 31 to rear end 32, and a width perpendicular to the length. The width extends between opposing side panels 33 of pickup truck 30. Pickup truck 30 includes a receiver 50 with a maintube 59 and a receiver tube 55. Maintube 59 extends along the width of pickup truck 30 and receiver tube 55 extends along the length of pickup truck 30. Receiver tube 55 is positioned between two frame rails 36 that extend along the length of pickup truck 30. First end 111 of body 115 of bracket hanger 110 is connected to bore 58 (shown in FIG. 4) of maintube 59. First end 111 may be directly connected to bore 58 by being positioned therein or may be connected indirectly through a coupler 200, 250 (shown in FIG. 6A and FIG. 6B), discussed below. As opposed to known mud flaps (such as shown in FIG. 8, which connects to the vehicle behind the bumper), mud flap assembly 100 is connected beneath bumper 40 of pickup truck 30. Mud flap assembly 100 is not positioned in the path of receiver tube 55. Notably, mud flap assembly 100 does not cover backup sensors 41 on bumper 40 of pickup truck 30.

As shown in FIG. 5, maintube 59 is located below bumper 40 of pickup truck 30 and behind (toward rear end 32) the wheel wells 35 of pickup truck 30. A first mud flap assembly 100A is connected to first end 51 of maintube 59 and a second mud flap assembly 100B is connected to second end 56 of maintube 59. First mud flap assembly 100A and second mud flap assembly 100B are collectedly and individually referred to as mud flap assembly 100. Bracket hanger 110 extends along the width of pickup truck 30 beneath bumper 40. First ends 111 of bracket hangers 110 are complementary to and inserted into first end 51 of maintube 59 and second end 56 of maintube 59, respectively. Second ends 116 of bracket hangers 110 extend beyond side panels 33 of pickup truck 30. Set screws 140 extend through maintube 59 and secure bracket hangers 110 within bore 58 (shown in FIG. 4) of maintube 59. Mud flaps 130 extend downward from bracket hangers 110 and terminate before contacting the ground. Mud flaps 130 do not interfere with top side 112 of bracket hangers 110 at second ends 116. A user may place a foot upon the top side 112 of bracket hanger 110 at second end 116 in order to hoist themselves upward to access the bed of pickup truck 30. Receiver tube 55 is unaffected by mud flap assembly 100 and a hitch 10 may be installed and removed without manipulation of mud flap assembly 100. Mud flap assembly 100 may be installed onto maintube 59 with hitch 10 already installed into receiver tube 55.

Figure 6A:
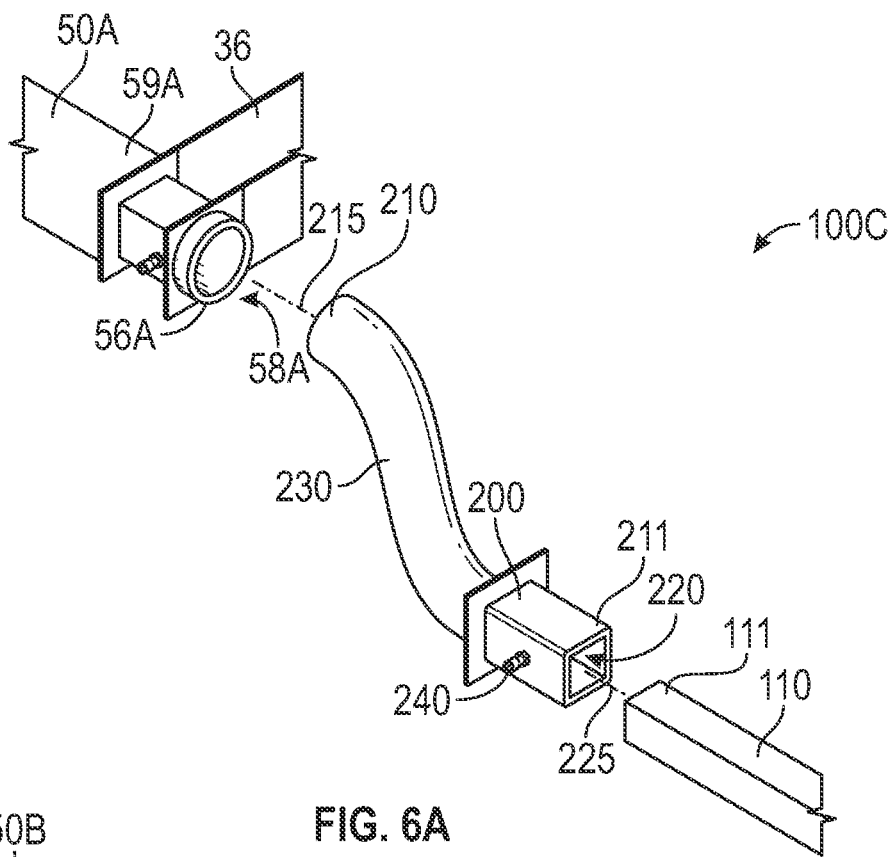
FIG. 6A shows an embodiment of a mud flap assembly with a coupler.

FIG. 6A shows an embodiment of a mud flap assembly 100C with a coupler 200. Mud flap assembly 100C is similar to mud flap assembly 100 but includes a coupler 200 that permits bracket hangers 110 of mud flap assembly 100 to be used with different vehicles. Another vehicle includes a receiver 50A with a maintube 59A that extends along a width of the vehicle. Maintube 59A includes a bore 58A at its end 56A that has a different shape from bore 58 of maintube 59 (shown in FIG. 4).

Coupler 200 includes a first end 210 and a coupler bore 220 at a second end 211. First end 210 of coupler 200 is complementary to bore 58A of maintube 59A. First end 111 of bracket hanger 110 is complementary to coupler bore 220 of coupler 200. First end 210 of coupler 200 has a different shape from first end 111 of bracket hanger 110. First end 210 of coupler 200 is received within bore 58A of maintube 59A and first end 111 of bracket hanger 110 is received within coupler bore 220 of coupler 200. First end 111 of bracket hanger 110 may have a rectangular shape, such as a square shape, and first end 210 of coupler 200 may have a circular shape.

First end 210 is aligned along a first axis 215 and second end 211 is aligned along a second axis 225. In some embodiments, first axis 215 is co-axial with second axis 225. Coupler 200 may include a transition section 230 between first end 210 and second end 211. Transition section 230 causes first axis 215 and second axis 225 to not be co-axial. First axis 215 and second axis 225 may be parallel. In some embodiments, a transition section may be incorporated directly into bracket hanger 110. A coupler 200 with transition section 230 may be advantageous to permit use of bracket hanger 110 with a vehicle where its corresponding maintube is not positioned entirely below the bumper of the vehicle, such as where the side panels or bumper of the vehicle extend below the ends of the maintube. A set screw 240 may extend through the wall of maintube 59A so that set screw 240 contacts bracket hanger 110 near first end 111.

By way of example, the maintube of a 2019 Ford F-350 may have a square cross-section and be located entirely below the bumper. Accordingly, a bracket hanger having a first end with a square shape may be received within the maintube. Also, by way of example, the maintube of a 2019 Chevrolet Silverado 3500 may have a circular cross-section and a portion of the bumper may extend below the ends of the maintube. Accordingly, a second bracket hanger having a first end with a circular shape may be received within this maintube. A coupler 200 with transition section 230 may be advantageous to permit, for example, use of a bracket hanger designed for use with a 2019 Ford F-350 to be used on a 2019 Chevrolet Silverado 3500 if the user were to change vehicles.

Figure 6B:
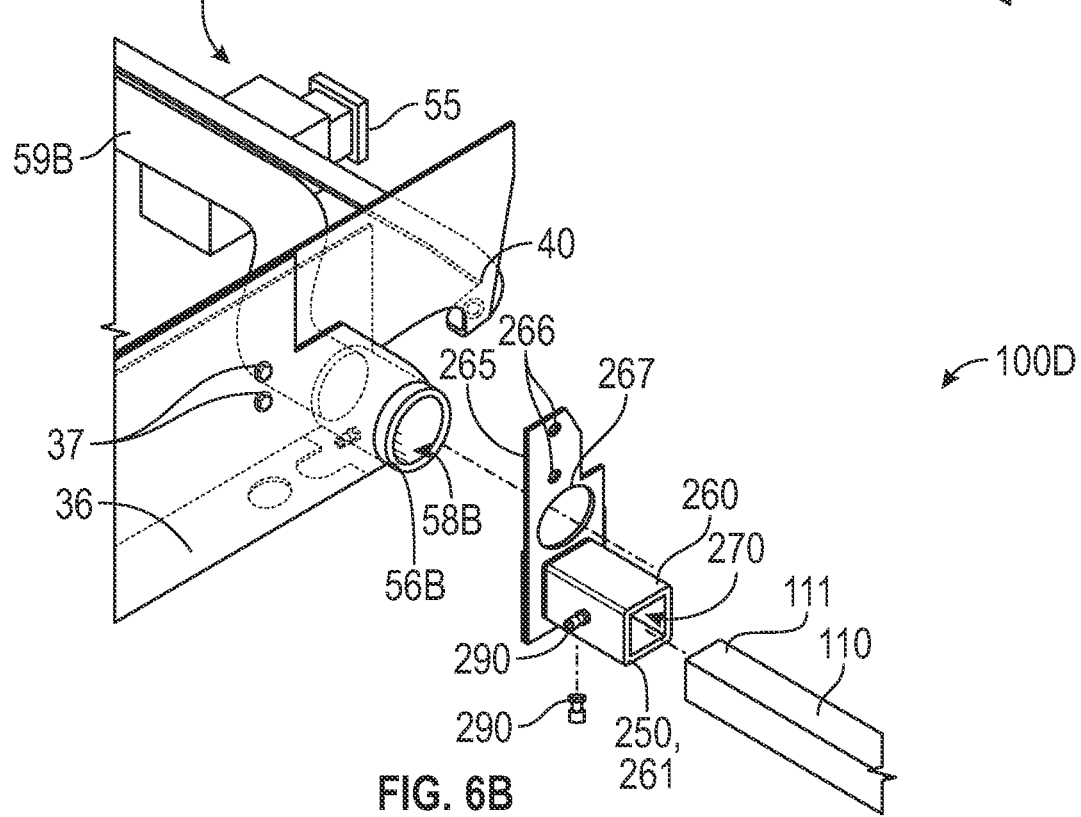
FIG. 6B shows an embodiment of a mud flap assembly with a coupler.

FIG. 6B shows an embodiment of a mud flap assembly 100D with a coupler 250. Mud flap assembly 100D is similar to mud flap assembly 100 but includes a coupler 250 that permits bracket hangers 110 of mud flap assembly 100 to be used with different vehicles. Another vehicle includes a receiver 50B with a maintube 59B that extends along a width of the vehicle. For purposes of illustration, side panels of the vehicle have been omitted and a portion of frame rail 36 has been shown as transparent. Maintube 59B sweeps backward from receiver tube 55 and extends through frame rail 36 such that its end 56B is on an outer side of frame rail 36. Unlike receivers 50 and 50A, discussed above, in some embodiments, maintube 59B may not include a bore 58B. By way of example, the maintube of a 2019 Ram 2500 may not have a bore.

Coupler 250 includes a first end 260 and a coupler bore 270 at a second end 261. First end 111 of bracket hanger 110 is complementary to coupler bore 270 of coupler 250. First end 111 of bracket hanger 110 is received within coupler bore 270 of coupler 250. First end 260 of coupler 250 includes a plate 265 configured to attach to the maintube 59B or frame rails 36 of a vehicle. Plate 265 may extend perpendicular to a length of coupler 250 extending between first end 260 and second end 261. Plate 265 may include bolt apertures 266 arranged in a pattern to be aligned with factory bolts 37 on the receiver 50B or frame rails 36 of the vehicle.

In some embodiments, plate 265 may include a second aperture 267 that is larger than bolt apertures 266. Second aperture 267 is complementary to end 56B of maintube 59B such that it is shaped to receive end 56B of maintube 59B. Second aperture 267 is positioned around end 56B of maintube 59B and bolt apertures 266 are aligned with factory bolts 37. Second aperture 267 may be a circular aperture. A set screw 290 may extend through the wall of maintube 59B so that set screw 290 contacts bracket hanger 110 near first end 111.

A coupler 250 may be advantageous to permit, for example, use of a bracket hanger designed for use with a 2019 Ford F-350 to be used on a 2019 Chevrolet Silverado 3500 if the user were to change vehicles.

Figure 7:
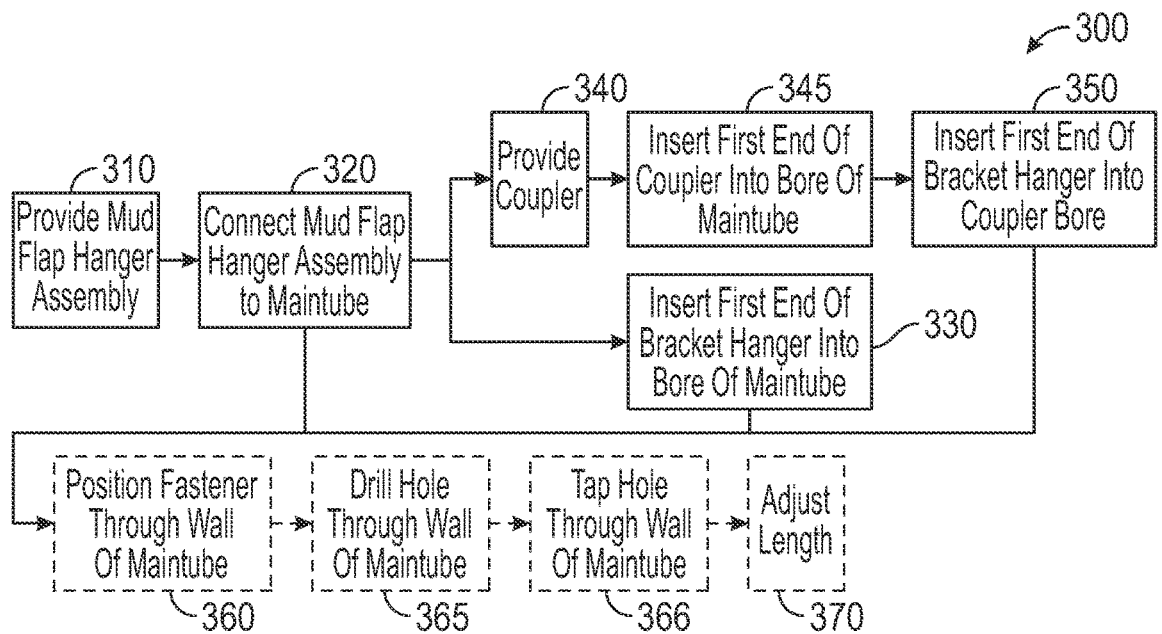
FIG. 7 is a flow chart of an embodiment of a method of installing a mud flap.

FIG. 7 is a flow chart of an embodiment of a method 300 of installing a mud flap on a vehicle. Method 300 may be repeated for installing mud flaps on both sides of a vehicle. Method 300 includes Action 310 of providing a mud flap assembly. The mud flap assembly has a bracket hanger with a body extending from a first end and a second end and mud flap connected to and extending downward from the bracket hanger. Method 300 includes Action 320 of connecting the mud flap assembly to a vehicle having a receiver with a maintube extending along a width of the vehicle. The first end of the body of the bracket hanger may be connected to the vehicle through a bore of the maintube. Method 300 may include Action 330 or Action 340, 345, 350.

Action 330 includes inserting the first end of the body of the bracket hanger into the bore of the maintube. The mud flap assembly is then secured to the maintube. Method 300 may include Actions 360, 365, and/or 370. In Action 360, the first end of the body of the bracket hanger is secured to the maintube by positioning a fastener, such as a set screw or pin, through a wall of the maintube. If a set screw is used, the set screw may contact the first end of the body of the bracket hanger. Action 365 includes drilling a hole through a wall of the maintube. The drilled hole may then be tapped in Action 366. The length of the mud flap assembly may be adjusted in Action 370. For example, the set screw may be loosened and the bracket hanger may slide within the bore of the maintube to adjust the amount of the bracket hanger that extends beyond the end of the maintube.

Action 340 includes providing a coupler. The coupler has a first end and a coupler bore. The first end of the coupler is complementary to the bore of the maintube. The first end of the bracket hanger is complementary to the coupler bore. The bore of the maintube has a different shape from the coupler bore. In Action 345, the first end of the coupler is inserted into the bore of the maintube. In Action 350, the first end of the bracket hanger is inserted into the coupler bore. The mud flap assembly is then secured to the maintube through the coupler. Actions 360, 365, 366 may be used to secure the coupler to the maintube with a fastener and/or repeated to secure the bracket hanger of the mud flap assembly to the coupler with a fastener.

Figure 9:
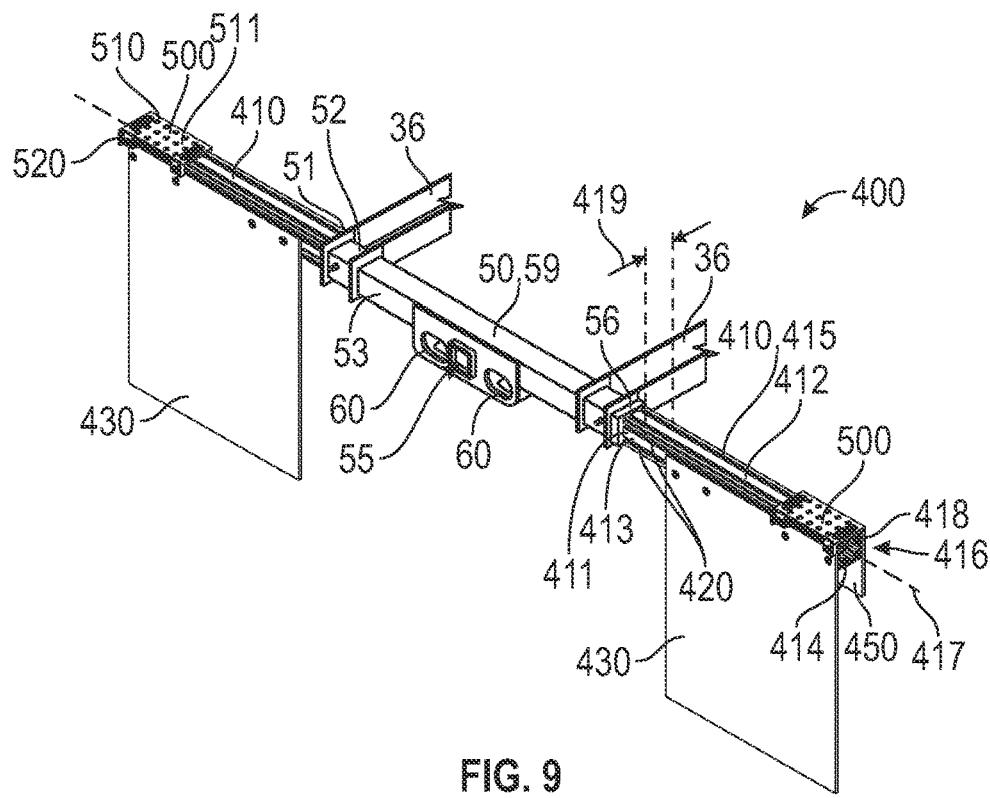
FIG. 9 shows an embodiment of a mud flap assembly.

FIG. 9 shows an embodiment of a mud flap assembly 400. Mud flap assembly 400 can be used with a vehicle, such as pickup truck 30 (shown in FIG. 5) that includes a receiver 50. For purposes of illustration, only receiver 50 of pickup truck 30 has been shown in FIG. 9. Mud flap assembly 400 can be used in place of mud flap assembly 100, shown in FIG. 1. Receiver tube 55 is located between the frame rails 36 and the mud flap assemblies 400 are positioned on the outer sides of the frame rails 36.

Mud flap assembly 400 includes a bracket hanger 410. Bracket hanger 410 has a body 415 extending from a first end 411 to a second end 416. Body 415 may extend linearly along an axis 417 from first end 411 to second end 416. The length of body 415 may be at least 30 inches. In some embodiments, first end 411 may not be linearly aligned with second end 416 in order to provide clearance for components on an underside of pickup truck 30 (not shown in FIG. 9). First end 411 of bracket hanger 410 is connected to first end 51 or second end 56 of maintube 59 to support mud flap assembly 400 upon the vehicle. First end 411 of bracket hanger 410 may be connected to maintube 59 by a complementary relationship or through a coupler that permits bracket hanger 410 to be secured to maintube 59 or to frame rails 36 adjacent to maintube 59.

In some embodiments, the shape of bracket hanger 410 at first end 411 is complementary to maintube 59 at first end 51 and/or second end 56 such that first end 411 of body 415 is shaped to be received within bore 58 (shown in FIG. 4) of maintube 59 and secured therein. In other embodiments, the complementary relationship may be reversed with a bore on the end of the bracket hanger and the end of the bracket hanger is received over the end of the maintube.

Body 415 includes a top side 412. When mud flap assembly 400 is positioned on a pickup truck, top side 412 is oriented towards the bed of the pickup truck. Top side 412 may have a width of at least two inches (measured perpendicular to a length of body 415 that extends from first end 411 to second end 416) and preferably at least 2.5 inches. Mud flap assembly 400 may include a platform 500 that forms a foot support to permit a user to access the bed of the pickup truck. Unlike known mud flap systems, bracket hanger 410 is formed of a material having a strength to support at least 300 pounds of load at second end 416 without permanently deforming or compromising the integrity of bracket hanger 410 during use of platform 500.

Platform 500 may be integral to bracket hanger 410 at second end 416 of bracket hanger 410 or may be moveably attached to bracket hanger 410. In some embodiments, platform 500 is slidably adjustable along the length of bracket hanger 410. Platform 500 includes a top portion 510 and a side portion 520. Top portion 510 has a top surface 511, which provides grip for a person stepping on platform 500.

Body 415 has a generally rectangular cross-section with a plurality of grooves 420 extending along the length of bracket hanger 410. In some embodiments, the height and width of body 415 are each at least 2.5 inches. Body 415 includes a top side 412 and a first lateral side 413. Each of top side 412 and first lateral side 413 includes at least one groove 420. Top side 412 may be perpendicular to top side 412.

In some embodiments, body 415 includes a second lateral side 418 opposite first lateral side 413. Second lateral side 418 includes at least one groove 420. Body 415 may also include a bottom side 414 that is opposite top side 412. Bottom side 414 may include at least one groove 420.

Mud flap assembly 400 includes a mud flap 430 connected to and extending downward from bracket hanger 410. In some embodiments, mud flap 430 may be connected to first lateral side 413. In some embodiments, mud flap 430 may be connected to second lateral side 418. In some embodiments, mud flap assembly 400 includes a heat shield 450 connected to and extending downward from bracket hanger 410. Heat shield 450 may be connected to second lateral side 418 of bracket hanger 410. Heat shield 450 is positioned on a mud flap assembly 400 adjacent to an exhaust of a vehicle. Heat shield 450 disperses heat from the exhaust and protects mud flap 430 from the heat. Unlike known heat shields, heat shield 450 does not contact mud flap 430. Heat shield 450 may hang down from bracket hanger 410 at least eight inches and in some embodiments between eight and ten inches. Heat shield 450 may be at least eight inches long and made of aluminum.

Figure 10:
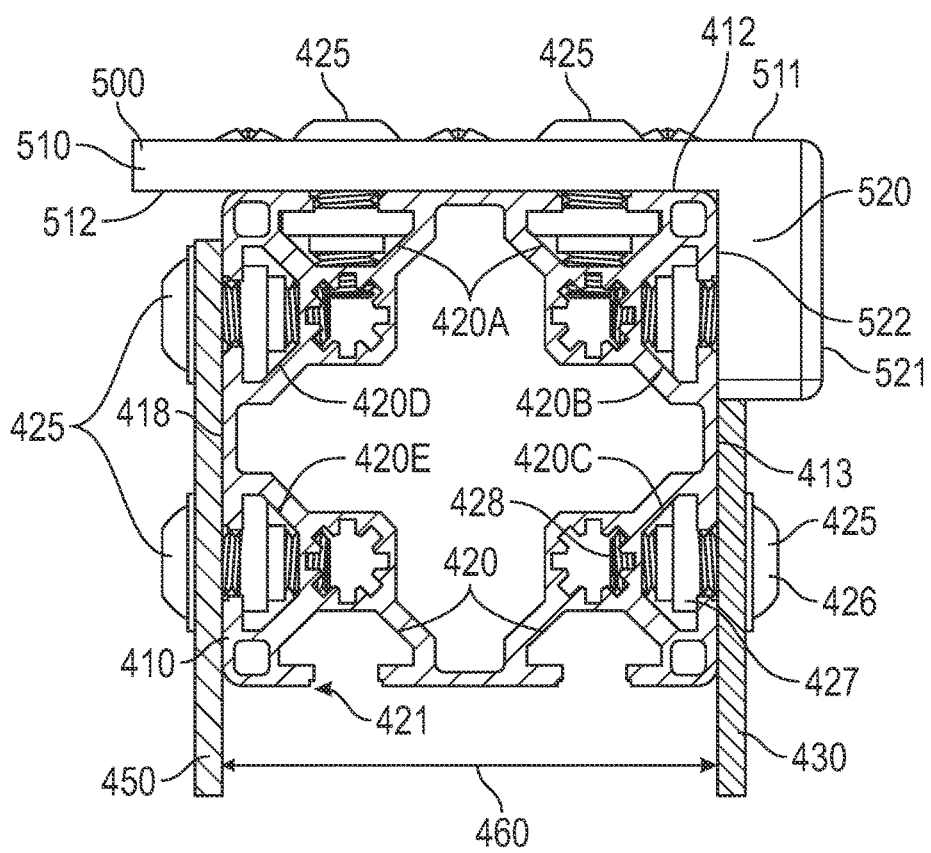
FIG. 10 is a cross-section view of the embodiment shown in FIG. 9.

FIG. 10 is a cross-section view of mud flap assembly 400, shown in FIG. 9. Bracket hanger 410 includes top side 412, first lateral side 413, bottom side 414, and second lateral side 418. Mud flap 430 is connected to first lateral side 413. Heat shield 450 is connected to second lateral side 418. Top side 412, first lateral side 413, bottom side 414, and/or second lateral side 418 may include a plurality of grooves 420. Each groove 420 is configured to receive a sliding fastener 425 that is inserted from first end 411 or second end 416 (shown in FIG. 9). Sliding fastener 425 has a head 426, a shaft 428, and a retainer 427 complementary to groove 420 to prevent it from being pulled through a throat 421 of the groove 420. Retainer 427 is axially adjustable on shaft 428. Retainer 427 may be a nut to receive a threaded shaft 428 to adjust the axial position on shaft 428. As fastener 425 is tightened it prevents the respective components (platform 500, mud flap 430, heat shield 450) from sliding along the length of bracket hanger 410.

Platform 500 may be connected to one or more of the plurality of grooves 420A on top side 412 via a plurality of sliding fasteners 425. The plurality of sliding fasteners 425 extend through top portion 510 of platform 500, through top side 412 of bracket hanger 410, and are secured within grooves 420A. A bottom surface 512 of top portion 510 is opposite top surface 511 and held in contact with top side 412 of bracket hanger 410 when the plurality of sliding fasteners 425 are tightened.

Platform 500 may be connected to one or more of the plurality of grooves 420 on first lateral side 413. The plurality of grooves 420 on first lateral side 413 may include a top groove 420B and a lower groove 420C. Top groove 420B and lower groove 420C may be spaced apart approximately one inch. For example, one or more sliding fasteners 425 extend through side portion 520 of platform 500, through first lateral side 413 of bracket hanger 410, and are secured within top groove 420B. An inner surface 522 of side portion 520 is held in contact with first lateral side 413 of bracket hanger 410 when the one or more sliding fasteners 425 are tightened. In some embodiments, the heads 426 of sliding fasteners 425 may be recessed within outer surface 521 of side portion 520.

Mud flap 430 may be connected to top groove 420B and/or lower groove 420C via a plurality of sliding fasteners 425 extending through mud flap 430 and through first lateral side 413. Generally, mud flap 430 is positioned closer to second end 416 of bracket hanger 410 than first end 411 of the bracket hanger 410. However, the plurality of fasteners 425 may be loosened, the position of the mud flap 430 adjusted, and the plurality of fasteners 425 may be tightened. Likewise, the top height of mud flap 430 may be adjusted by switching between top groove 420B and lower groove 420C. This may be particularly advantageous when mud flap assembly 400 is used on different vehicles and/or the ride height of the vehicle is altered, such as when a pickup has a full payload.

Heat shield 450 may be connected to one or more of the plurality of grooves 420 on second lateral side 418. The plurality of grooves 420 on second lateral side 418 may include a top groove 420D and a lower groove 420E. A plurality of sliding fasteners 425 extend through heat shield 450, through second lateral side 418, and are secured within top groove 420D and/or lower groove 420E. A portion of heat shield 450 contacting second lateral side 418 may be thermally insulated to inhibit heat from transmitting into bracket hanger 410.

In some embodiments, heat shield 450 is shaped such that it does not contact mud flap 430. Mud flap 430 and heat shield 450 are positioned on opposing lateral sides of bracket hanger 410 such that they form an airgap 460 therebetween. Airgap 460 inhibits heat from transferring through heat shield 450 and into mud flap 430. Airgap 460 may be at least two inches and preferably at least 2.5 inches.

Preferably, bracket hanger 410 is made of aluminum. Preferably, each groove 420 has a T-slot profile such that the groove width is wider than a throat of the groove to generally form a "T" shape. As used herein, T-slot profile includes profiles having beveled or curved edges, which are sometimes referred to in the aluminum extrusion industry as "v-slot."

Figure 11:
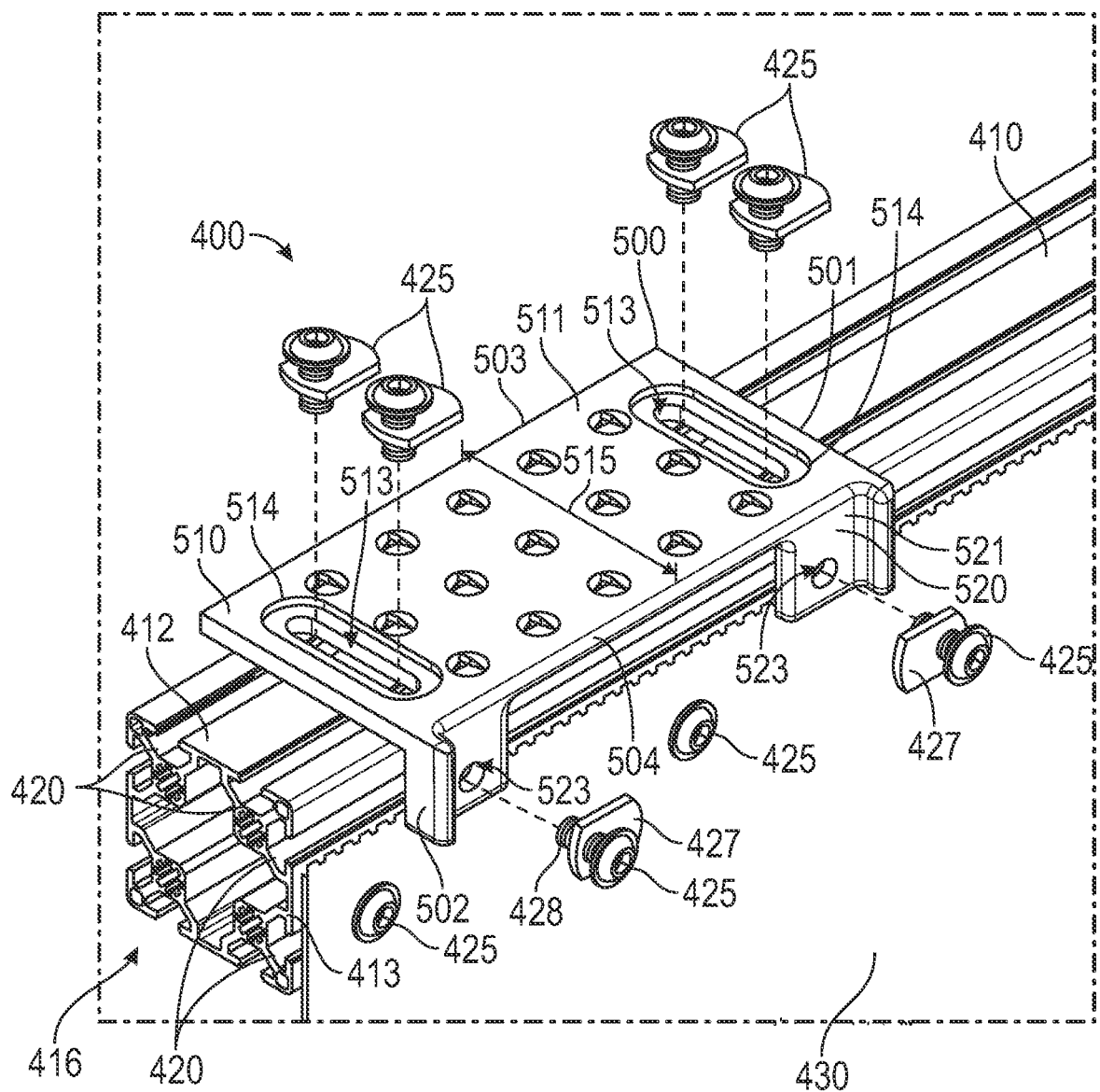
FIG. 11 is a detailed view of a portion of the embodiment shown in FIG. 9.

FIG. 11 shows a partially exploded view of mud flap assembly 400 including bracket hanger 410, mud flap 430, platform 500, and a plurality of fasteners 425. Platform 500 includes a first end 501 and a second end 502, with a length extending therebetween. Top portion 510 extends from first end 501 to second end 502. The length of top surface 511 of top portion 510 is at least 6.5 inches and preferably between eight and twelve inches. Top surface 511 of top portion 510 has a width 515 that is perpendicular to its length. Width 515 extends from a rear 503 to a front 504 of platform 500. The length of top surface 511 may be greater than width 515 of top surface 511. Width 515 may be at least 3.5 inches and preferably at least 3.75 inches. Width 515 of top surface 511 is larger than the width 419 of the bracket hanger 410 at the first end 411 (shown in FIG. 9). Top portion 510 includes one or more openings 513 extending through the thickness of top portion 510. Openings 513 may be located within recessed sections 514 of top portion 510. Openings 513 may be slots.

Side portion 520 extends downward from front 504 of top portion 510. Side portion 520 includes one or more openings 523 extending through the thickness of side portion 520. Outer surface 521 of side portion 520 is perpendicular to top surface 511.

The retainers 427 of the plurality of fasteners 425 are inserted into the grooves 420 at the second end 416 of bracket hanger 410. The shafts 428 of the fasteners 425 are inserted through the openings 513, 523 in platform 500 or through mud flap 430 and into the retainers 427. Once platform 500 and mud flap 430 are oriented in the desired position, the plurality of fasteners 425 are tightened to maintain their position along bracket hanger 410.

Figure 12:
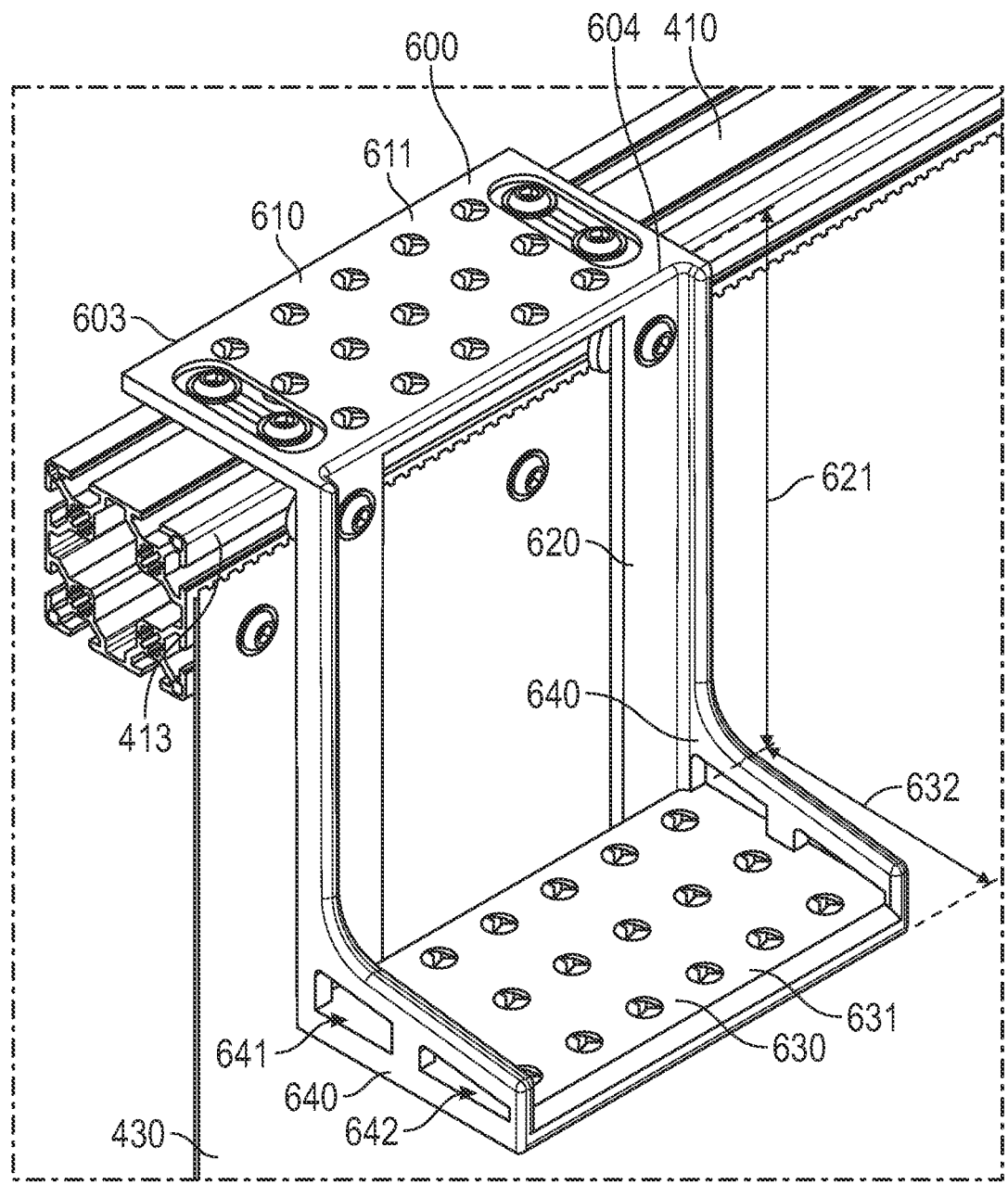
FIG. 12 shows an embodiment of a mud flap assembly.

FIG. 12 shows an embodiment of foot support 600 formed of a first platform 610 and a second platform 630. Foot support 600 creates multiple steps and may be particularly advantageous for lifted vehicles. Foot support 600 may be used in place of the foot support created by platform 500.

Foot support 600 connects to bracket hanger 410 in the same manner as platform 500 and includes the same features. Foot support 600 includes a first platform 610 having a top surface 611, a side portion 620, and a second platform 630. First platform 610 has a width extending from a rear 603 to a front 604 of first platform 610. Second platform 630 include a top surface 631 to support a foot. Top surface 631 is parallel to top surface 611. Side portion 620 extends downward from first platform 610 to second platform 630 at a height 621 such that top surface 631 is positioned between at least seven inches below top surface 611. In some embodiments, height 621 is between seven to ten inches.

First platform 610 and second platform 630 are horizontally offset. First platform 610 extends laterally beyond first lateral side 413 of bracket hanger 410 at least the thickness of the mud flap 430 and side portion 620 extends along a face of mud flap 430. Top surface 631 on second platform 630 extends laterally away from the mud flap 430 and has a width 632. In some embodiments, width 632 is at least 3.5 inches and preferably at least 3.75 inches. First platform 610 and second platform 630 are rigidly connected and may be formed of a unitary piece.

Second platform 630 may include braces 640 at each end of top surface 631. Braces 640 extend downward from front 604 of first platform 610 along the side portion 620 and along the width 632 of top surface 631 of second platform 630. Braces 640 may include one or more vertical openings 641, 642 to permit water and foreign materials to be removed from top surface 631.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims an equivalents thereof.

What is claimed is:

1. A mud flap assembly comprising:
a bracket hanger having a body with a length extending between a first end and a second end and a width perpendicular to the length, the first end of the bracket hanger being configured to connect to a receiver of a vehicle, the body including at least one groove extending along the length of the bracket hanger, the at least one groove including a first groove;
a mud flap connected to the bracket hanger, the mud flap extending along the length of the bracket hanger and extending downward from the bracket hanger; and
a foot support connected to the bracket hanger, the foot support including a first platform having a length extending along the length of the bracket hanger and a width perpendicular to the length of the first platform, the foot support being slidably connected in the first groove.

2. The mud flap assembly of claim 1, wherein the width of the first platform is greater than the width of the bracket hanger.

3. The mud flap assembly of claim 2, wherein the length of the first platform is greater than the width of the first platform.

4. A mud flap assembly comprising:
a bracket hanger having a body with a length extending between a first end and a second end and a width perpendicular to the length, the first end of the bracket hanger being configured to connect to a receiver of a vehicle;
a mud flap connected to the bracket hanger, the mud flap extending along the length of the bracket hanger and extending downward from the bracket hanger; and
a foot support connected to the bracket hanger, the foot support including a first platform having a length extending along the length of the bracket hanger and a width perpendicular to the length of the first platform, and a second platform rigidly connected to the first platform, the first platform being positioned above the bracket hanger, the second platform being positioned below the first platform.

5. The mud flap assembly of claim 4, wherein the first platform and the second platform are horizontally offset.

6. The mud flap assembly of claim 5, wherein the foot support includes a plurality of braces extending downward from the first platform and along a top surface of the second platform.

7. The mud flap assembly of claim 1, wherein the body of the bracket hanger includes a top side, a first lateral side, and a second lateral side opposite the first lateral side, the mud flap being connected to the first lateral side.

8. A mud flap assembly comprising:
a bracket hanger having a body with a length extending between a first end and a second end and a width perpendicular to the length, the first end of the bracket hanger being configured to connect to a receiver of a vehicle, the body including a top side, a first lateral side, a second lateral side opposite the first lateral side, and at least one groove extending along the length of the bracket hanger, the mud flap being connected to the first lateral side, wherein the at least one groove is positioned on the second lateral side;
a mud flap connected to the bracket hanger, the mud flap extending along the length of the bracket hanger and extending downward from the bracket hanger;
a foot support connected to the bracket hanger, the foot support including a first platform having a length extending along the length of the bracket hanger and a width perpendicular to the length of the first platform; and
a heat shield slidably connected in the at least one groove.

9. The mud flap assembly of claim 8, wherein the heat shield does not contact the mud flap.

10. The mud flap assembly of claim 9, wherein the heat shield and the mud flap form an airgap therebetween having a thickness of at least two inches.

11. The mud flap assembly of claim 7, wherein the at least one groove is a plurality of grooves including the first groove and a second groove, the first groove positioned on the top side and the second groove positioned on the first lateral side, the mud flap being slidably connected in the second groove.

12. The mud flap assembly of claim 11, wherein the plurality of grooves includes a third groove positioned on the second lateral side, and further comprising a heat shield slidably connected in the third groove.

13. The mud flap assembly of claim 11, wherein the plurality of grooves includes a fourth groove positioned on the first lateral side, the fourth groove positioned above the second groove, the foot support being slidably connected in the fourth groove.

14. The mud flap assembly of claim 11, wherein the plurality of grooves have a T-slot profile.

15. The mud flap assembly of claim 11, wherein the first platform includes a top surface having a plurality of openings and recessed sections, the openings positioned within the recessed sections of the top surface and each shaped to receive a shaft of a fastener, the fastener slidably connecting the foot support to the bracket hanger.

16. The mud flap assembly of claim 1, wherein the first end of the bracket hanger has a shape complementary to a bore of a maintube of the receiver of the vehicle.

17. The mud flap assembly of claim 16, further comprising a coupler having a first end and a coupler bore opposite the first end, the first end of the coupler being complementary to an end of a maintube extending along a width of a second vehicle, the first end of the coupler having a different shape from the first end of the bracket hanger, and the coupler bore being complementary to the first end of the bracket hanger.

18. The mud flap assembly of claim 1, wherein the at least one groove is a plurality of grooves, the body of the bracket hanger includes a top side, a first lateral side, and a second lateral side opposite the first lateral side, two of the plurality of grooves are on the top side, two of the plurality of grooves are on the first lateral side, and two of the plurality of grooves are on the second lateral side.

19. The mud flap assembly of claim 18, wherein the two of the plurality of grooves on the first lateral side include a second groove, the two of the plurality of grooves on the second lateral side include a third groove, the mud flap is slidably connected in the second groove, and further comprising a heat shield slidably connected in the third groove.

20. The mud flap assembly of claim 1, further comprising a coupler having a first end, a second end, a plate at the first end, and a coupler bore at the second end, the plate is configured to attach to a frame rail of a vehicle, the coupler bore is complementary to the first end of the bracket hanger.

\* \* \* \* \*